US006995812B2

(12) United States Patent
Anno et al.

(10) Patent No.: US 6,995,812 B2
(45) Date of Patent: Feb. 7, 2006

(54) LIQUID CRYSTAL DISPLAY DEVICE

(75) Inventors: Kouichi Anno, Mobara (JP); Hiroko Hayata, Mobara (JP); Tohru Sasaki, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/114,188

(22) Filed: Apr. 26, 2005

(65) Prior Publication Data

US 2005/0190311 A1 Sep. 1, 2005

Related U.S. Application Data

(63) Continuation of application No. 10/099,997, filed on Mar. 19, 2002, now Pat. No. 6,912,026.

(30) Foreign Application Priority Data

Apr. 12, 2001 (JP) .............................. 2001-113730

(51) Int. Cl.
$G02F\ 1/1335$ (2006.01)
(52) U.S. Cl. ........................................ 349/14; 349/114
(58) Field of Classification Search ................ 349/114, 349/138, 38, 39, 14
See application file for complete search history.

(56) References Cited

U.S. PATENT DOCUMENTS

| | | | |
|---|---|---|---|
| 6,195,140 B1 | 2/2001 | Kubo et al. | |
| 6,295,109 B1 | 9/2001 | Kubo et al. | |
| 6,341,002 B1 | 1/2002 | Shimizu et al. | |
| 6,525,788 B1 | 2/2003 | Nakagawa et al. | |
| 6,620,655 B2 | 9/2003 | Ha et al. | |
| 6,717,632 B2 * | 4/2004 | Ha et al. | 349/43 |
| 6,833,883 B2 * | 12/2004 | Park et al. | 349/43 |

FOREIGN PATENT DOCUMENTS

| | | |
|---|---|---|
| JP | 11-101992 | 7/1998 |
| JP | 11-316382 | 7/1998 |
| JP | 2000-19563 | 12/1998 |
| KR | 2001-0009014 | 7/1999 |

* cited by examiner

*Primary Examiner*—Kenneth Parker
*Assistant Examiner*—David Chung
(74) *Attorney, Agent, or Firm*—Reed Smith, LLP; Stanley P. Fisher, Esq.; Juan Carlos A. Marquez, Esq.

(57) ABSTRACT

The present invention provides a liquid crystal display device which can largely suppress the reduction of contrast which occurs in a light reflection mode of a liquid crystal display device. On a liquid-crystal-side surface of one of substrates which are arranged to face each other in an opposed manner while sandwiching liquid crystal therebetween, the liquid crystal display device includes pixel regions each of which is classified into a light reflection portion and a light transmission portion. On each pixel region, a first light-transmitting pixel electrode which is formed on the light reflection portion and the light transmission portion, a material layer which is formed on a major portion of the light reflection portion, an insulation layer having an opening formed at a portion corresponding to the light transmission portion, and a second pixel electrode which is formed on the light reflection portion and functions as a reflection film are sequentially laminated.

17 Claims, 5 Drawing Sheets

LIQUID CRYSTAL DISPLAY DEVICE

This application is a Continuation application of U.S. application Ser. No. 10/099,997 filed on Mar. 19, 2002 now U.S. Pat. No. 6,912,026. Priority is claimed based on U.S. application Ser. No. 10/099,997 filed on Mar. 19, 2002 which claims the priority of Japanese application 2001-113730 filed on Apr. 12, 2001.

BACKGROUND OF THE INVENTION

The present invention relates to a liquid crystal display device, and more particularly to a so-called "partial transmission type" active matrix liquid crystal display device.

In an active matrix type liquid crystal display device, on a liquid-crystal-side surface of one of respective transparent substrates which are arranged to face each other in an opposed manner while sandwiching liquid crystal therebetween, gate signal lines which are extended in the x direction and are arranged in the y direction in parallel and drain signal lines which are extended in the y direction and are arranged in the x direction in parallel are formed, and regions surrounded by these respective signal lines are formed as pixel regions.

A thin film transistor which is driven by scanning signals from a one-side gate signal line and a pixel electrode to which video signals are supplied from a one-side drain signal line through the thin film transistor are provided to each pixel region.

Further, with respect to such a liquid crystal display device, a so-called partial transmission type liquid crystal display device includes a light transmission portion which constitutes a region which allows light from a backlight disposed at a back surface side to pass therethrough and a light reflection portion which constitutes a region in which an external light such as sun beams are reflected on each pixel region.

The light transmission portion is formed of a region which constitutes the pixel electrode using a light-transmitting conductive layer and the light reflection portion is formed of a region which constitutes the pixel electrode using a non-light-transmitting conductive layer having a light-reflecting function.

However, with respect to the liquid crystal display device having such a constitution, it has been pointed out that the contrast of display is largely reduced particularly when the liquid crystal display device is used in a light reflection mode.

As a result of the study of causes of such phenomenon, inventors of the present invention have found that the pixel electrode which is formed on the light reflection portion is constituted of the non-light-transmitting conductive layer and hence, a capacitive element or the like is generated at a lower-layer side of the pixel region in many cases whereby the height of the pixel electrode which also functions as a reflection film differs with respect to a substrate.

The difference in height of the reflection film results in the difference of layer thickness of liquid crystal in such portions and this brings about the lowering of contrast.

For example, it has been known from a result of an experiment that when the difference of 0.2 $\mu$m is generated with respect to the height of the reflection film, the contrast is halved.

The present invention is made in view of such circumstances and it is an object of the present invention to provide a liquid crystal display device which can enhance the contrast.

SUMMARY OF THE INVENTION

To simply explain the summary of typical examples among inventions which are disclosed in the specification, they are as follows.

Means 1.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein on each pixel region, a first light-transmitting pixel electrode which is formed on the light reflection portion and the light transmission portion, a material layer which is formed on a major portion of the light reflection portion, an insulation layer in which an opening is formed at the light transmission portion, and a second pixel electrode which is formed on the light reflection portion and also functions as a reflection film are sequentially laminated.

Means 2.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, and on each pixel region, the first light-transmitting pixel electrode which is formed on the light reflection portion and the light transmission portion, a material layer which is formed on a major portion of the light reflection portion, an insulation layer in which an opening is formed at the light transmission portion, and the second pixel electrode which is formed on the light reflection portion and also functions as a reflection film are sequentially laminated.

Means 3.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, a material layer which is formed on a major portion of the light reflection portion, an insulation layer in which an opening is formed at the light transmission portion, and the second pixel electrode which is formed on the light reflection portion and also functions as a reflection film are sequentially laminated, and a total layer thickness of the first pixel electrode and the material layer and a layer thickness of the gate signal line are respectively set to equal to or less than 100 nm.

Means 4.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, a material layer which is formed on a major portion of the light reflection portion, an insulation layer in which an opening is formed at the light transmission portion, and the second pixel electrode which is formed on the light reflection portion and also functions as a reflection film are sequentially laminated, and the difference between a total layer thickness of the first pixel electrode and the material layer and a layer thickness of the gate signal line is set to equal to or less than 0.1 $\mu$m.

Means 5.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, and on each pixel region, the first light-transmitting pixel electrode which is formed on the light reflection portion and the light transmission portion, an extension layer of a source electrode of the thin film transistor which is connected to the first pixel electrode and is formed on a major portion of the light reflection portion, an insulation layer in which an opening is formed at the light transmission portion, and the second pixel electrode which is formed on the light reflection portion, is connected to the source electrode through a contact hole formed in the insulation layer and also functions as a reflection film are sequentially laminated.

Means 6.

A liquid crystal display device according to the present invention includes, for example, pixel regions each of which is divided into a light reflection portion and a light transmission portion on a liquid-crystal-surface side of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, an extension layer of a source electrode of the thin film transistor which is connected to the first pixel electrode and is formed on a major portion of the light reflection portion, an insulation layer in which an opening is formed at the light transmission portion, and the second pixel electrode which is formed on the light reflection portion, is connected to the source electrode through a contact hole formed in the insulation layer and also functions as a reflection film are sequentially laminated, and the difference between a total layer thickness of the first pixel electrode and the extension layer of the source electrode and a layer thickness of the gate signal line is set to equal to or less than 0.1 $\mu$m.

Means 7.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, a material layer which is formed on a major portion of the light reflection portion, an insulation layer in which an opening is formed at the light transmission portion, and the second pixel electrode which is formed on the light reflection portion and also functions as a reflection film are sequentially laminated, and the second pixel electrode is formed in a superposed manner on the other gate signal line out of the pair of gate signal lines.

Means 8.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, a material layer which is formed on a major portion of the light reflection portion, an insulation layer in which an opening is formed at the light transmission portion, and the second pixel electrode which is formed on the light reflection portion and also functions as a reflection film are sequentially laminated, and the second pixel electrode is formed in a superposed manner on the other gate signal line out of the pair of gate signal lines, and a height adjusting material which is provided for setting the difference between a height of the second pixel electrode with respect to the substrate in the light reflection portion and a height of the second pixel electrode which is formed in a superposed manner on the other gate signal line with respect to the substrate to equal to or less than 0.1 $\mu$m is interposed at at least one of the light reflection portion and the other gate signal line.

Means 9.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, and on each pixel region, the first light-transmitting pixel electrode which is formed on the light reflection portion and the light transmission portion, a material layer which is formed on a major portion of the light reflection portion, an insulation layer which is formed on the light reflection portion and the light transmission portion, and the second pixel electrode which is formed on the light reflection portion and also functions as a reflection film are sequentially laminated.

Means 10.

A liquid crystal display device according to the present invention includes, for example, pixel regions each of which is divided into a light reflection portion and a light transmission portion on a liquid-crystal-side surface of one substrate out of substrates which are arranged to face each other in an opposed manner while sandwiching liquid crystal therebetween, wherein the pixel region is formed as a region which is surrounded by a pair of gate signal lines and a pair of drain signal lines and includes a thin film transistor which is operated in response to scanning signals from one gate signal line out of the pair of gate signal lines and first and second pixel electrodes to which video signals from one drain signal line out of the pair of drain signal lines are supplied through the thin film transistor, on each pixel region, the first light-transmitting pixel electrode which is formed on the light reflection portion and the light transmission portion, a material layer which is formed on a major portion of the light reflection portion, an insulation layer which is formed on the light reflection portion and the light transmission portion, and the second pixel electrode which is formed on the light reflection portion and also functions as a reflection film are sequentially laminated, and the difference between a total layer thickness of the first pixel electrode and the material layer and a layer thickness of the gate signal line is set to equal to or less than 0.1 $\mu$m.

Means 11.

A liquid crystal display device according to any one of the means 1 to the means 10 includes, for example, a backlight.

DESCRIPTION OF THE PREFERRED EMBODIMENTS

Embodiments of a liquid crystal display device according to the present invention are explained in detail in conjunction with drawings hereinafter.

<<Overall Equivalent Circuit>>

Figure 2:
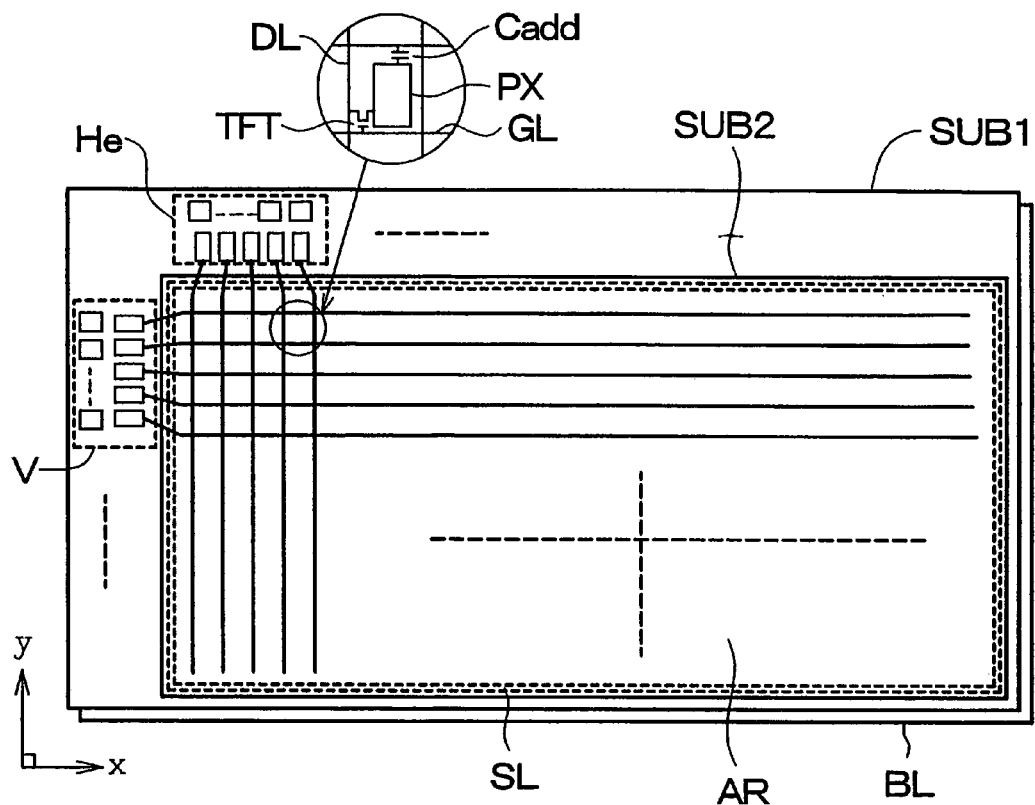
FIG. 2 is a plan view showing one embodiment of an equivalent circuit of the whole liquid crystal display device according to the present invention.

FIG. 2 is a plan view showing one embodiment of an overall equivalent circuit of a liquid crystal display device according to the present invention.

In the drawing, there are shown a pair of transparent substrates SUB1, SUB2 which are arranged to face each other in an opposed manner while inserting liquid crystal therebetween. The liquid crystal filled in a space defined between a pair of transparent substrates SUB1, SUB2 is sealed by a sealing member SL which is also served for fixing the other transparent substrate SUB2 to one transparent substrate SUB1.

On a liquid-crystal-side surface of one transparent substrate SUB1 which is surrounded by the sealing member SL, gate signal lines GL which are extended in the x direction and are arranged in the y direction in parallel and drain signal lines DL which are extended in the y direction and are arranged in the x direction in parallel are formed.

Regions which are surrounded by respective gate signal lines GL and respective drain signal lines DL constitute pixel regions and a liquid crystal display part AR is constituted by a mass of these respective pixel regions arranged in a matrix array.

On each pixel region, a thin film transistor TFT which is operated by the supply of scanning signals from the one-side gate signal line GL and a pixel electrode PX to which video signals are supplied from the one-side drain signal line DL by way of the thin film transistor TFT are formed.

The pixel electrode PX forms a capacitive element Cadd between the pixel electrode PX and other gate signal line GL which is different from the gate signal line GL for driving the thin film transistor TFT. Due to this capacitive element Cadd, the video signals supplied to the pixel electrode PX are stored for a relatively long time.

The pixel electrode PX in each pixel region is configured to generate an electric field between the pixel electrode PX and a counter electrode CT which is formed in common with respective pixel regions on the other transparent substrate SUB2. The light transmittivity of the liquid crystal can be controlled in response to this electric field.

Respective ends of the gate signal lines GL are extended over the sealing member SL and the extended end constitute terminals to which output terminals of a vertical scanning driving circuit V are connected. Further, signals from a printed circuit board which is arranged outside the liquid crystal display device are inputted to input terminals of the vertical scanning driving circuit V.

The vertical scanning driving circuit V includes a plurality of semiconductor devices, wherein a plurality of neighboring gate signal lines GL are formed into a group and one semiconductor device is allocated to each group.

Respective ends of the drain signal lines DL are extended over the sealing member SL and the extended ends constitute terminals to which output terminals of a video signal driving circuit He are connected. Further, signals from the printed circuit board which is arranged outside the liquid crystal display device are inputted to input terminals of the video signal driving circuit He.

This video signal driving circuit He also includes a plurality of semiconductor devices, wherein a plurality of neighboring drain signal lines DL are formed into a group and one semiconductor device is allocated to each group.

Respective gate signal lines GL are sequentially selected one by one in response to the scanning signals from the vertical scanning driving circuit V.

Further, the video signals are supplied to respective drain signal lines DL by the video signal driving circuit He while being matched with the timing of the selection of the gate signal lines GL.

A backlight BL is mounted on a back surface of the liquid crystal display device having such a constitution and this light source is turned on when the liquid crystal display device is used in a transmission mode.

Although the vertical scanning driving circuit V and the video signal driving circuit He are respectively mounted on the transparent substrate SUB1 in this embodiment, it is needless to say that the present invention is not limited to such a constitution and these circuits V, He may be provided outside the transparent substrate SUB1.

<<Constitution of Pixels>>

Figure 1:
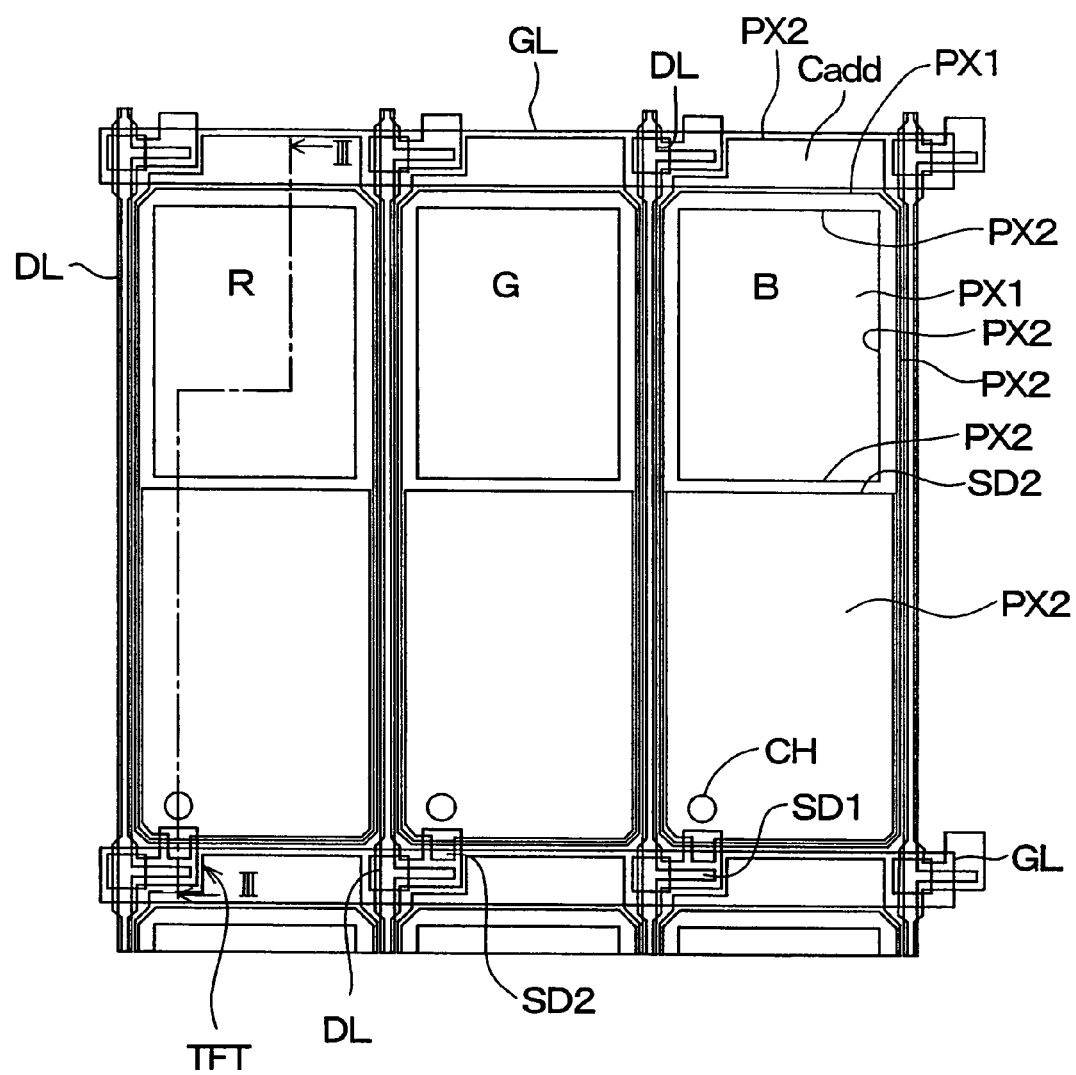
FIG. 1 is a plan view showing one embodiment of a pixel of a liquid crystal display device according to the present invention.

FIG. 1 is a plan view showing one embodiment of the pixel regions. Although respective pixels for R, G and B are shown in the drawing as pixels for color display, they only differ in color of color filters and have the same constitution.

Figure 3:
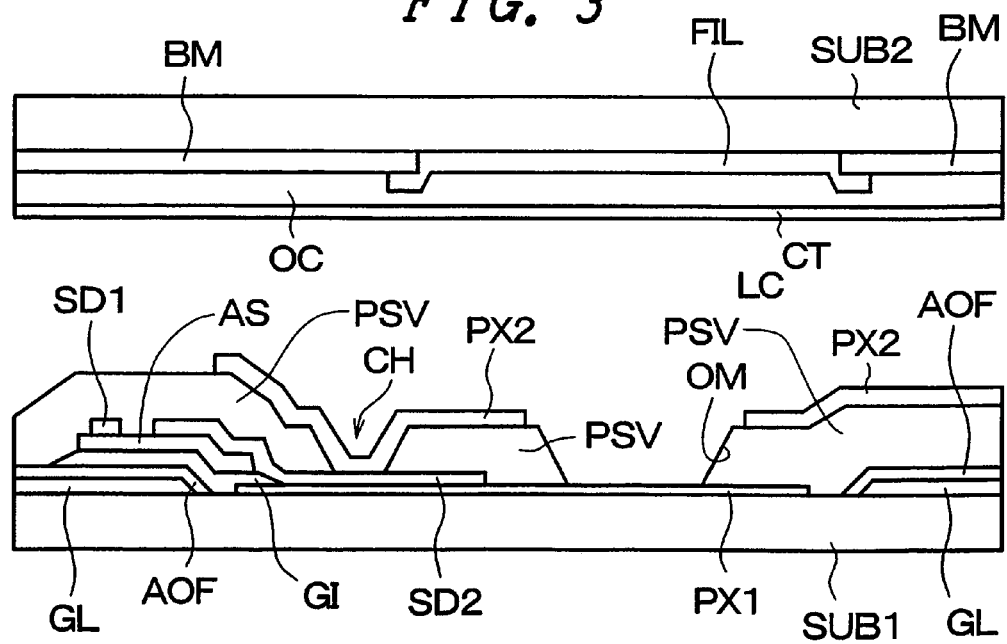
FIG. 3 is a cross-sectional view taken along a line III—III of FIG. 1.

Following explanation is made by focusing on one pixel out of these three pixels. A cross section taken along a line III—III in the drawing is shown in FIG. 3.

In the drawing, on a liquid-crystal-side surface of the transparent substrate SUB1, first of all, a pair of gate signal lines GL which are extended in the x direction and are arranged in parallel in the y direction are formed. These gate signal lines GL are, for example, made of Al (aluminum) and anodic oxidation films AOF are formed on surfaces of the gate signal lines GL.

These gate signal lines GL surround a rectangular region together with a pair of drain signal lines DL which will be explained later and this region constitutes a pixel region.

A light-transmitting pixel electrode PX1 formed of an ITO (Indium-En-Oxide) film, for example, is formed on a central portion of the pixel region except for a trivial peripheral portion.

The pixel electrode PX1 functions as a pixel electrode in a region of the pixel region which allows light from a backlight BL to pass therethrough and is classified from a pixel electrode PX2 which also functions as a reflection electrode as will be explained later.

On the surface of the transparent substrate SUB1 on which the gate signal lines GL and the pixel electrodes PX1 are formed, an insulation film GI made of, for example, SiN (silicon nitride) is formed. The insulation film GI is formed such that the insulation film GI is extended over regions where thin film transistors TFT are formed (partial regions of gate signal lines GL) and portions where the gate signal lines GL and the drain signal lines DL cross each other arranged in the vicinity of the thin-film-transistor forming regions.

The insulation film GI which is formed over the regions where thin film transistors TFT are formed functions as a gate insulation film of the thin film transistors TFT and the insulation film GI which is formed over the portions where the gate signal lines GL and the drain signal lines DL cross each other functions as an interlayer insulation film.

On a surface of the insulation film GI, a semiconductor layer AS made of amorphous Si (silicon) is formed.

The semiconductor layer AS constitutes a semiconductor layer of the thin film transistor TFT. That is, by forming a drain electrode SD1 and a source electrode SD2, an MIS transistor having an inverse stagger structure which uses a portion of the gate signal line GL as a gate electrode can be formed.

The semiconductor layer AS is formed such that the semiconductor layer AS is also extended over the portion where the gate signal line GL and the drain signal line DL cross each other thus strengthening the function of these signal lines as the interlayer insulation film together with the insulation film GI.

Further, although not shown in the drawing, above the surface of the semiconductor layer AS and in a boundary between the drain electrode SD1 and the source electrode SD2, a semiconductor layer doped with impurity (for example, phosphorus) of high concentration is formed and a contact layer d0 is formed of this semiconductor layer.

The drain electrode SD1 and the source electrode SD2 are formed simultaneously with the formation of the drain signal lines DL.

That is, the drain signal lines DL which are extended in the y direction and are arranged in parallel in the x direction are formed, a portion of each drain signal line DL is extended over an upper surface of the semiconductor layer AS thus forming the drain electrode SD 1, and the source electrode SD2 is formed spaced apart from the drain electrode SD1 by a channel length of the thin film transistor TFT.

The drain signal line DL is constituted of a sequentially laminated body made of Cr and Al, for example.

The source electrode SD2 is slightly extended from the semiconductor layer AS surface such that the source electrode SD2 reaches the pixel region side thus establishing the electric connection between the source electrode SD2 and the pixel electrode PX1. Further, the source electrode SD2 is provided with a contact portion to establish the electric connection between the source electrode SD2 and the pixel electrode PX2 which also functions as a reflection electrode as will be explained later.

Here, the extension portion of the source electrode SD2 not only performs the function of connecting the source electrode SD2 to the pixel electrodes PX1 and PX2 as mentioned above but also is extended over a major portion of a light reflection portion (region where the pixel electrode PX2 is formed as will be explained later) such that the difference in height due to a step does not appear remarkably in the pixel electrode PX2 in the light reflection portion.

That is, when the extension portion of the source electrode SD2 is provided with only the function of connecting the source electrode SD2 to the pixel electrodes PX1 and PX2, the extension portion may be formed as a contact portion and the extension portion becomes relatively short. Accordingly, a step formed around the extension portion explicitly appears remarkably on a surface which forms the pixel electrode PX2 which also functions as the reflection electrode as will be explained later (upper surface of a protective film PSV which will be explained later) so that a step is also formed on a surface of the pixel electrode PX2.

Further, with the use of the constitution of this embodiment, the extension portion of the source electrode SD2 occupies a region of relatively large area and this implies that the side is relatively elongated.

Accordingly, in the fabrication of the liquid crystal display device, impurities such as dusts hardly remains in the vicinity of the pixel electrode PX2 so the drawbacks derived from the impurities can be obviated.

Here, when the gate electrode of the thin film transistor TFT functions as the contact portion, the area of the contact portion is small and the side thereof is formed in a slightly complicated manner due to the selective etching using a photolithography technique and hence, impurities such as dusts remain here so that the function of the gate electrode as the contact portion has been often damaged.

Over the surface of the transparent substrate SUB1 on which the drain signal lines DL and the drain electrodes SD1 and the source electrodes SD2 of the thin film transistors TFT are formed, a protective film PSV made of SiN, for example, is formed. This protective film PSV is a layer which obviates the direct contact of the thin film transistor TFT with the liquid crystal LC and is served for preventing the deterioration of the characteristics of the thin film transistors TFT.

In portions of the protective film PSV which correspond to the light transmission portions of the pixel regions, opening portions OM are formed. The light-transmitting pixel electrodes PX1 are exposed through these opening portions OM. The opening portions OM of the protective film PSV through which the pixel electrode PX1 is exposed are regions which constitute the light transmission portions and define regions which are classified from the regions of the light reflection portions in the pixel regions.

Further, in the protective film PSV, the contact holes CH which are formed simultaneously with the formation of the opening portions OM are formed. A portion of the source electrode SD2 of the thin film transistor TFT is exposed through each contact hole CH.

On an upper surface of the protective film PSV, the pixel electrodes PX2 which also function as the reflection electrodes are formed. Each pixel electrode PX2 is formed of a non-light transmitting conductive film consisting of a sequential laminating body made of Cr and Al, for example.

The pixel electrode PX2 is formed such that the pixel electrode PX2 occupies a major portion of the pixel region while avoiding the region where the opening portion OM is formed in the protective film PSV.

Then, the pixel electrode PX2 has a portion thereof electrically connected to the source electrode SD2 of the thin film transistor TFT through the contact hole CH which is partially formed in the portion of the protective film PSV.

Further, the pixel electrode PX2 is formed such that the pixel electrode PX2 is extended to a position where the pixel electrode PX2 is superposed on other neighboring gate signal line GL which is different from the gate signal line GL for driving the above-mentioned thin film transistor TFT. A capacitive element Cadd which uses the protective film PSV as an dielectric film is formed in the extension portion of the pixel electrode PX2.

Over the upper surface of the transparent substrate SUB1 on which the pixel electrodes PX2 are formed, an orientation film (not shown in the drawing) is formed such that the orientation film also covers the pixel electrodes PX2 and the like. The orientation film is a film which is directly brought into contact with the liquid crystal LC and determines the initial orientation direction of molecules of the liquid crystal LC by rubbing a surface thereof.

The transparent substrate SUB2 is arranged to face the transparent substrate SUB1 having such a constitution in an opposed manner while sandwiching the liquid crystal therebetween. On a liquid-crystal-side surface of the transparent substrate SUB2, a black matrix BM is formed such that the black matrix BM defines respective pixel regions. That is, the black matrix BM which is formed over at least the liquid crystal display part AR is provided with a pattern which forms openings except for peripheral portions of respective pixel regions thus enhancing the contrast of display.

Further, the black matrix BM is formed such that the black matrix BM sufficiently covers the thin film transistors TFT of the transparent substrate SUB1 side so that it is possible to prevent an external light from being irradiated to the thin film transistors TFT whereby the deterioration of the characteristics of the thin film transistors TFT can be obviated. The black matrix BM is formed of a resin film which contains black pigment therein, for example.

Over the surface of the transparent substrate SUB2 on which the black matrix BM is formed, color filters FIL are formed such that these color filters FIL cover the openings formed in the black matrix BM. These color filters FIL are constituted of filters of respective colors consisting of red (R), green (G) and blue (B), for example. Here, the red filter, for example, is formed in common with respect to a group of respective pixel regions which are arranged in parallel in the y direction, while with respect to such groups of pixel regions which are arranged in the x direction, they are sequentially arranged in the order of red (R), green (G), blue (B), red (R), . . . . These respective filters are formed of resin films which contain pigments corresponding to respective colors.

Over the surface of the transparent substrate SUB2 on which the black matrix BM and the color filters FIL are formed, a flattening film OC is formed such that the flattening film OC also covers the black matrix BM and the color filters FIL. The flattening film OM is a resin film which is formed by coating and is served for eliminating steps which become apparent due to the formation of the black matrix BM and the color filters FIL.

Over an upper surface of the flattening film OC, a light transmitting conductive film made of an ITO film, for example, is formed. With the provision of this conductive film, a counter electrode CT which corresponds to respective pixel regions in common is formed.

Over a surface of the flattening film OC, an orientation film (not shown in the drawing) is formed. The orientation film is a film which is directly brought into contact with the liquid crystal LC and determines the initial orientation direction of molecules of the liquid crystal LC by rubbing a surface thereof. In the liquid crystal display device having such a constitution, the source electrode SD2 of each thin film transistor TFT is formed such that the source electrode SD2 is extended to a region corresponding to the light reflection portion of the pixel region.

Accordingly, the pixel electrode PX2 which is formed on the light reflection portion by way of the protective film PSV can be formed in a flattened shape with no difference in height derived from the steps.

This enables the liquid crystal to have a uniform layer thickness in the light reflection portion so that the irregularities of contrast which is generated due to the irregularities of the layer thickness can be drastically suppressed.

Further, although it is not directly relevant to the light reflection portion, the height of the pixel electrode PX2 with respect to the transparent substrate SUB1 in the portion where the capacitive element Cadd is formed can be set substantially equal to the height of the pixel electrode PX2 with respect to the transparent substrate SUB1 in the light reflection portion.

Although a portion on which the capacitive element Cadd is formed constitutes a portion covered with the black matrix BM, at a portion which is disposed in the inside of the opening of the black matrix BM and is disposed close to the capacitive element Cadd, it is possible to prevent the generation of the influence derived from the difference in height of the pixel electrode PX2 with respect to the transparent substrate SUB1.

Accordingly, by respectively setting "a layer thickness of the gate signal line GL" and "a total layer thickness of the source electrode SD2 of the pixel electrode PX1 and the thin film transistor TFT" to equal to or less than 100 nm, it is possible to suppress the irregularities of height of the pixel electrode PX2 with respect to the transparent substrate SUB1 as small as possible.

Then, by setting the difference between "the layer thickness of the gate signal line GL" and "the total layer thickness of the source electrode SD2 of the pixel electrode PX1 and the thin film transistor TFT" to equal to or less than 0.1 $\mu$m, it is possible to restrict the irregularities of height of the pixel electrode PX2 with respect to the transparent substrate SUB1 to equal to or less than 0.1 $\mu$m.

Due to such a constitution, the layer thickness of the liquid crystal LC can be substantially made uniform in the light reflection portion of the pixel region and hence, the reduction of the contrast can be suppressed.

In the above-mentioned embodiment, the source electrode SD2 of each thin film transistor TFT is sufficiently extended over the light reflection portion so as to prevent the generation of steps of the pixel electrode PX2 which is formed on the source electrode SD2.

However, it is needless to say that the same advantageous effect can be obtained by using other material layer which is electrically (or physically) separated from the source electrode SD2.

In this case, since the film thickness of the material layer can be set irrespective of the source electrode SD2 of the thin film transistor TFT, an advantageous effect that the flattening of the pixel electrode PX2 can be easily achieved is obtained.

<<Fabricating Method>>

Hereinafter, one embodiment of the fabricating method of the transparent-substrate-SUB1 side of the above-mentioned liquid crystal display device is explained in conjunction with FIG. 4A to FIG. 4F.

Figure 4:
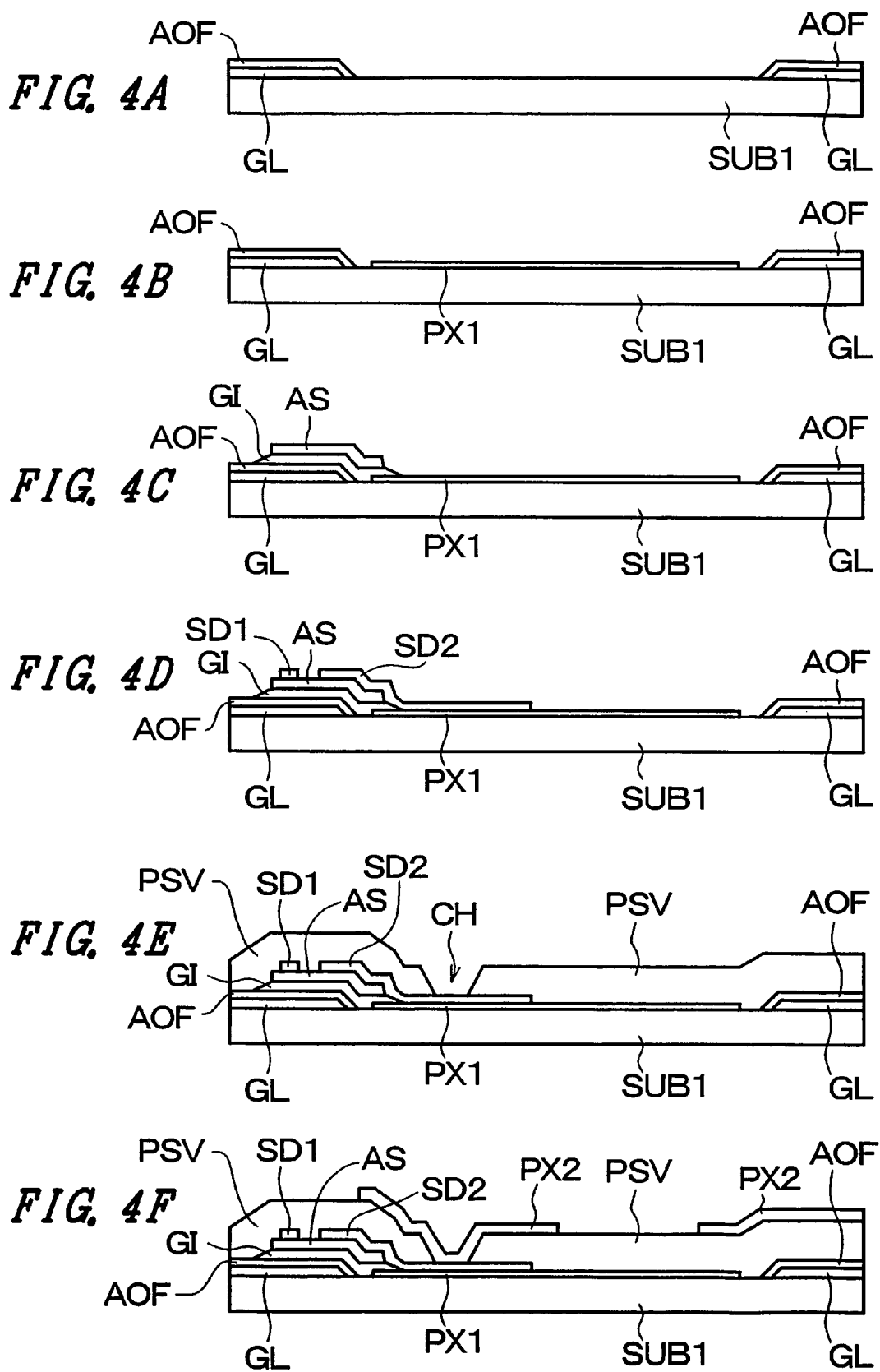
FIG. 4A to FIG. 4F are process flow views showing one embodiment of a manufacturing method of the liquid crystal display device according to the present invention.

Step 1. (FIG. 4A)

The transparent substrate SUB1 was prepared and an Al film having a film thickness of approximately 260 nm was formed on a main surface (liquid-crystal-side surface) of the transparent substrate SUB1 by a sputtering method, for example. Then, the Al film was selectively etched using a photolithography technique so as to form the gate signal lines GL.

Then, the gate signal lines GL were subjected to the anodic oxidation in a tartaric acid solution so as to form anodic oxidation films AOF on the gate signal lines GL. It is preferable to set a film thickness of the anodic oxidation films AOF to approximately 154 nm.

Step 2. (FIG. 4B)

On the main surface of the transparent substrate SUB1 on which the gate signal lines GL were formed, a light-transmitting conductive film formed of an ITO (Indium-Tin-Oxide) film, for example, was formed and the conductive film was selectively etched by a photolithography technique so as to form the pixel electrodes PX1.

Step 3. (FIG. 4C)

The insulation film made of SiN having a film thickness of approximately 240 nm was formed on the main surface of the transparent substrate SUB1 on which the pixel electrodes PX1 were formed using a CVD method, for example. In the same manner, an amorphous silicon layer having a film thickness of approximately 200 nm was formed on the insulation film and, thereafter, an n$^+$-type amorphous silicon layer doped with phosphorus (P) and having a film thickness of approximately 35 nm was formed on the amorphous silicon film.

Then, the selective etching was performed using a photolithography technique to etch the semiconductor layer and the insulation film together so as to form the insulation film GI and the semiconductor layers AS. As such an etching, a dry etching which uses a sulfur hexafluoride gas is suitable.

Here, since the etching speed of the amorphous silicon is greater than the etching speed of the insulation film, a normal taper having an angle of approximately 4° is provided to sides which constitute a profile of the insulation film GI and a normal taper having an angle of approximately 70° is provided to sides which constitute a profile of the semiconductor layer AS.

Step 4. (FIG. 4D)

A Cr layer and an Al layer were sequentially formed on the main surface of the transparent substrate SUB1 on which the insulation film GI and the semiconductor layers AS were formed using a sputtering method, for example. Here, it is preferable to set a film thickness of the Cr layer to 30 nm and a film thickness of the Al layer to 200 nm.

Thereafter, the selective etching was performed using a photolithography technique so as to form the drain signal lines DL and the drain electrodes SD1 and the source electrodes SD2 of the thin film transistors TFT having a two-layered structure.

Here, it is preferable to use a mixed solution of phosphoric acid, hydrochloric acid and nitric acid as an etchant for Al, while it is preferable to use a cerium nitrate ammonium solution as an etchant for Cr.

Then, using the drain electrodes SD1 and the source electrodes SD2 of the patterned thin film transistors TFT as masks, the $n^+$-type amorphous silicon layers formed on the surface of the semiconductor layers AS exposed from the masks were etched. Here, it is preferable to adopt a dry etching which uses a sulfur hexafluoride gas as an etchant.

Step 5. (FIG. 4E)

On the main surface of the transparent substrate SUB1 on which the drain signal lines DL and the drain electrodes SD1 and the source electrodes SD2 of the thin film transistors TFT were formed, an SiN film having a film thickness of approximately 600 nm was formed using a CVD method, for example, and the SiN film was selectively etched using a photolithography technique to form the protective film PSV.

In performing such an etching, the contact holes CH which expose the portions of the extension portions of the source electrodes SD2 of the thin film transistors TFT were simultaneously formed.

Step 6. (FIG. 4F)

A Cr layer and an Al layer were sequentially formed on the main surface of the transparent substrate SUB1 on which the protection film PSV was formed using a sputtering method, for example. Then, the Cr layer and the Al layer were selectively etched using a photolithography technique to form the pixel electrodes PX2 which also function as the reflection electrodes.

Here, it is preferable to use a mixed solution of phosphoric acid, hydrochloric acid and nitric acid as an etchant for Al, while it is preferable to use an ammonium cerium nitrate solution as an etchant for Cr.

In this case, openings were formed in the pixel electrodes PX2 such that each opening occupies approximately a half of the pixel region.

Thereafter, openings were formed on portions of the protective films PSV which were exposed from the openings of the pixel electrodes PX2 so as to expose the pixel electrodes PX1 as shown in FIG. 3, wherein these portions constitute the light transmission portions.

In place of sequentially forming the Cr layer and the Ar layer to form the pixel electrodes PX2, a Mo alloy layer and an Al layer may be sequentially formed or a Mo alloy layer and an Al alloy layer may be sequentially formed. It is preferable to use MoCr as the Mo alloy. This is advantageous since the etching can be performed at one time.

Embodiment 2

Figure 5:
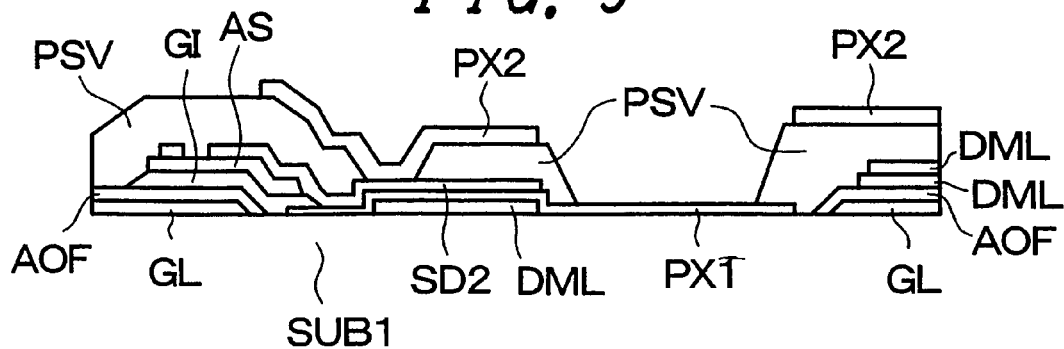
FIG. 5 is a cross-sectional view showing another embodiment of the pixel of the liquid crystal display device according to the present invention.

FIG. 5 is a constitutional view showing another embodiment of the liquid crystal display device of the present invention and corresponds to FIG. 3 which shows the constitution of the embodiment 1.

In constitution, this embodiment differs from the embodiment 1 shown in FIG. 3 in that material layers DML for adjusting height are formed at portions where the light reflection portions and capacitive elements Cadd are formed.

Due to such a constitution, the difference in height of the respective pixel electrodes PX2 with respect to the transparent substrate SUB1 at these portions can be set to equal to or less than 0.1 $\mu$m.

Accordingly, as shown in FIG. 5, it is needless to say that it is unnecessary to form the material layers DLM for adjusting height respectively at the portions where the light reflection portions are formed and at the portions where the capacitive elements Cadd are formed, that is, the material layers DLM for adjusting height can be formed either at the portions where the light reflection portions are formed or at the portions where the capacitive elements Cadd are formed.

Embodiment 3

Figure 6:
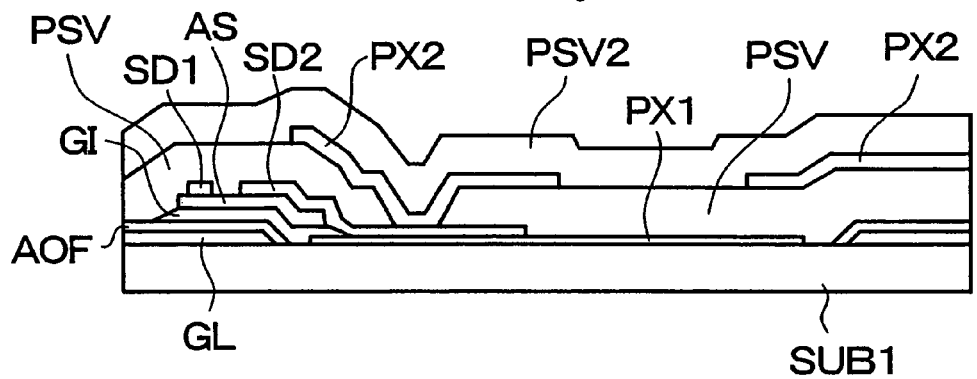
FIG. 6 is a cross-sectional view showing another embodiment of the pixel of the liquid crystal display device according to the present invention.

FIG. 6 is a constitutional view showing still another embodiment of the liquid crystal display device of the present invention and corresponds to FIG. 3 which shows the constitution of the embodiment 1.

In constitution, this embodiment differs from the embodiment 1 shown in FIG. 3 in that a protective film PSV2 which is made of SiN, for example, is further formed on an upper surface of the pixel electrodes PX2 and neither the protective film PSV nor the protective film PSV2 is provided with opening portions OM.

Embodiment 4

Figure 7:
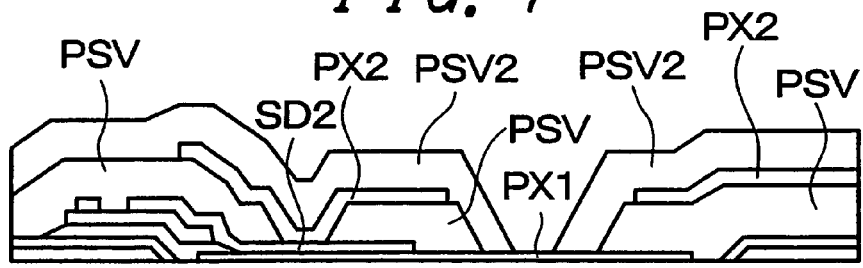
FIG. 7 is a cross-sectional view showing another embodiment of the pixel of the liquid crystal display device according to the present invention.

FIG. 7 is a constitutional view showing still another embodiment of the liquid crystal display device of the present invention and corresponds to FIG. 6 which shows the constitution of the embodiment 3.

In constitution, this embodiment differs from the embodiment 3 shown in FIG. 6 in that both of the protective films PSV, PSV2 are provided with opening portions and side walls of the protective films PSV2 are formed such that these side walls cover side walls of the protective films PSV.

Embodiment 5

Figure 8:
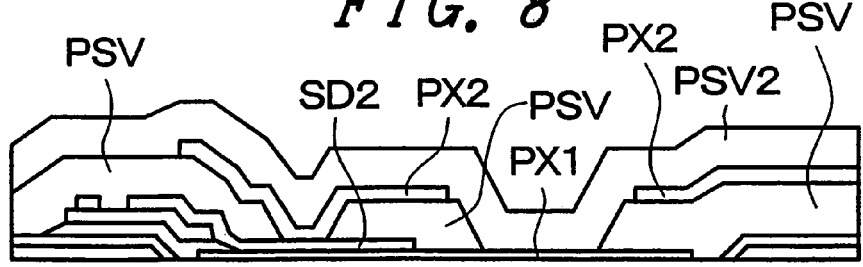
FIG. 8 is a cross-sectional view showing another embodiment of the pixel of the liquid crystal display device according to the present invention.

FIG. 8 is a constitutional view showing still another embodiment of the liquid crystal display device of the present invention and corresponds to FIG. 6 which shows the constitution of the embodiment 3.

In the drawing, opening portions are formed in the protective films PSV, while opening portions are not formed in the protective films PSV2.

Embodiment 6

Figure 9:
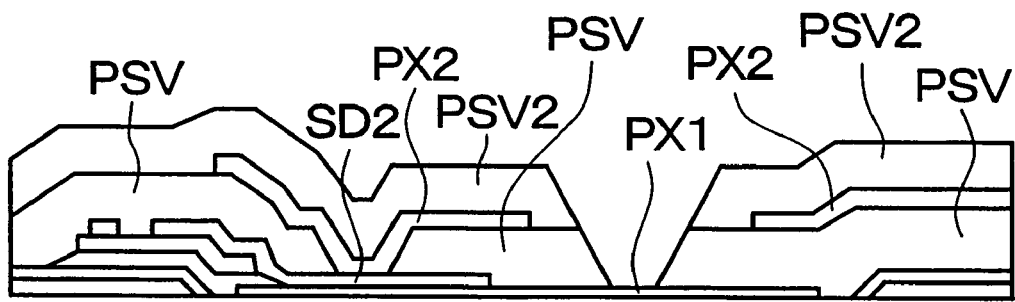
FIG. 9 is a cross-sectional view showing another embodiment of the pixel of the liquid crystal display device according to the present invention.

FIG. 9 is a constitutional view showing still another embodiment of the liquid crystal display device of the present invention and corresponds to FIG. 6 which shows the constitution of the embodiment 3.

In the drawing, both of the protective films PSV, PSV2 are provided with opening portions and dislocations between the protective films PSV, PSV2 are observed at the side walls of the openings with naked eyes.

Embodiment 7

In the above-mentioned respective embodiments, the pixel electrodes PX2 which also function as the reflection electrodes are formed as the pattern which has openings within the planar region. Such a constitution brings about an advantageous effect that even when a physical disconnection occurs at a portion of the pixel electrode PX2 where a line width is narrow, the electrical separation can be obviated.

Figures 10A, 10B:
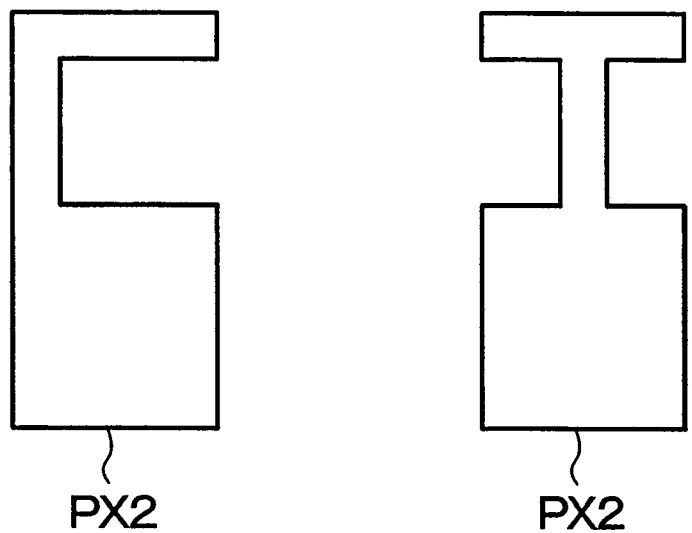
FIG. 10A to FIG. 10B are plan views showing other embodiments of a pixel electrode which also functions as a reflection electrode of the liquid crystal display device of the present invention.

However, the present invention is not limited to the above-mentioned constitution shown in respective embodiments and, as shown in FIG. 10A and FIG. 10B, it is needless to say that the pixel electrodes PX2 which also function as the reflection electrodes can be formed using a pattern which cuts away portions of sides of the pixel electrodes.

Due to such a constitution, even at a portion of the pixel electrode PX2 where a line width is narrow, the portion can ensure the width wider than the line width of the portion of the pixel electrode PX2 in the previous embodiment and hence, the probability of the occurrence of disconnection can be suppressed to a small value.

Further, in the above-mentioned respective embodiments, the capacitive element which has one terminal thereof formed as the pixel electrode has the other end thereof formed as the gate signal line GL. However, it is needless to say that the present invention is directly applicable to a constitution in which, for example, a capacitive element line is formed separately from the gate signal line GL in the pixel region and the capacitive element is formed between the capacitive element line and the pixel electrode.

In such a constitution, the capacitance element line is usually formed substantially in parallel to the gate signal line GL and except that the capacitance element line exhibits the electric function different from the function of the gate signal line GL, the other constitution of the liquid crystal display device such as the layer structure is exactly as same as the corresponding constitution of the previous embodiments and hence, the present invention is applicable directly.

As can be clearly understood from the foregoing explanation, according to the liquid crystal display device of the present invention, the reduction of the contrast which is generated in the light reflection mode can be drastically suppressed.

What is claimed is:

1. A liquid crystal display device comprising:
a liquid crystal which is sandwiched between substrates; and
pixel regions each of which is divided into a light reflection portion and a light transmission portion on a liquid-crystal-side surface of one substrate out of the substrates;
wherein the each pixel region including:
a capacitive element which stores a video signal;
a first light-transmitting pixel electrode which is formed on the light transmission portion and a major portion of the light reflection portion except for a region of the capacitive element when viewed in a plan view;
a material layer which is formed on a major portion of the light reflection portion except for a region of the capacitive element when viewed in a plan view;
an insulation layer; and
a second pixel electrode which is formed on the light reflection portion and also functions as a reflection film,
wherein the first light-transmitting pixel electrode, the material layer, the insulation layer and the second pixel electrode are sequentially laminated in this order.

2. A liquid crystal display device according to claim 1, wherein the pixel region is surrounded by a pair of scanning signal lines and a pair of video signal lines,
the pixel region includes a thin film transistor which is operated in response to a scanning signal from a scanning signal line out of the pair of scanning signal lines, and
the first and second pixel electrodes are supplied the video signal from a video signal line out of the pair of video signal lines through the thin film transistor.

3. A liquid crystal display device according to claim 2, wherein a total layer thickness of the first pixel electrode and the material layer and a layer thickness of the scanning signal line are respectively set to equal to or less than 100 nm.

4. A liquid crystal display device according to claim 2, wherein a difference between a total layer thickness of the first pixel electrode and the material layer and a layer thickness of the scanning signal line is set to equal to or less than 0.1 µm.

5. A liquid crystal display device according to claim 2, wherein the material layer is an extension layer of an electrode of the thin film transistor.

6. A liquid crystal display device according to claim 5, wherein a difference between a total layer thickness of the first pixel electrode and the extension layer of the electrode of the thin film transistor and a layer thickness of the scanning signal line is set to equal to or less than 0.1 µm.

7. A liquid crystal display device according to claim 2, wherein the second pixel electrode is superposed on other scanning signal line out of the pair of scanning signal lines through the insulation layer.

8. A liquid crystal display device according to claim 7, wherein a difference between a total layer thickness of the first pixel electrode and the material layer and a layer thickness of the scanning signal line is set to equal to or less than 0.1 µm.

9. A liquid crystal display device according to claim 7, wherein a height adjusting material is provided on at least one of the light reflection portion and the other scanning signal line, and
a difference between a height of the second pixel electrode with respect to the substrate in the light reflection portion except for the region of he capacitive element and a height of the second pixel electrode with respect to the substrate in a region superposed on the other scanning signal line out of the pair of scanning signal lines through the insulation layer is set to equal to or less than 0.1 µm by the height adjusting material.

10. A liquid crystal display device according to claim 2, further comprising a capacitance element line;
wherein the second pixel electrode is superposed on the capacitance element line through the insulation layer.

11. A liquid crystal display device according to claim 10, wherein a difference between a total layer thickness of the first pixel electrode and the material layer and a layer thickness of the capacitance element line is set to equal to or less than 0.1 µm.

12. A liquid crystal display device according to claim 10, wherein a height adjusting material is provided on at least one of the light reflection portion and the capacitance element line, and
a difference between a height of the second pixel electrode with respect to the substrate in the light reflection portion except for the region of the capacitive element and a height of the second pixel electrode with respect to the substrate in a region superposed on the capacitance element line is set to equal to or less than 0.1 µm by the height adjusting material.

13. A liquid crystal display device according to claim 10, wherein the material layer is an extension layer of an electrode of the thin film transistor.

14. A liquid crystal display device according to claim 13, wherein a difference between a total layer thickness of the first pixel electrode and the extension layer of the electrode of the thin film transistor and a layer thickness of the capacitance element line is set to equal to or less than 0.1 µm.

15. A liquid crystal display device according to claim 1, wherein the insulation layer has an opening at the light transmission portion.

16. A liquid crystal display device according to claim 1, wherein the insulation layer is formed at the light transmission portion and the light reflection portion.

17. A liquid crystal display device according to claim 1, further comprising a backlight.

* * * * *